United States Patent
Chiba

(10) Patent No.: US 9,060,137 B2
(45) Date of Patent: Jun. 16, 2015

(54) IMAGE PROCESSING APPARATUS DETECTING POSITION BETWEEN MOBILE DEVICE AND RECEPTION AREAS AND RECEIVING AN INSTRUCTION OF PROCESSES

(75) Inventor: Kunihisa Chiba, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 155 days.

(21) Appl. No.: 13/475,447

(22) Filed: May 18, 2012

(65) Prior Publication Data
US 2012/0293839 A1 Nov. 22, 2012

(30) Foreign Application Priority Data
May 20, 2011 (JP) .................................. 2011-114038

(51) Int. Cl.
*G06K 15/00* (2006.01)
*H04N 1/00* (2006.01)
*H04N 1/32* (2006.01)

(52) U.S. Cl.
CPC ....... *H04N 1/32448* (2013.01); *H04N 1/32454* (2013.01); *H04N 1/32496* (2013.01); *H04N 1/00342* (2013.01)

(58) Field of Classification Search
CPC . H04N 1/32; H04N 1/32122; H04N 1/32448; H04N 1/00392; H04N 1/00411; H04N 1/00474; H04N 1/00962; H04N 1/32454; H04N 1/32496; H04N 2201/0094; H04N 2201/3205; H04N 2201/3222; H04N 2201/3274; H04N 2201/3278
See application file for complete search history.

(56) References Cited

U.S. PATENT DOCUMENTS

| | | | |
|---|---|---|---|
| 8,854,644 B2 * | 10/2014 | Chiba | 358/1.13 |
| 2007/0033540 A1 * | 2/2007 | Bridges et al. | 715/769 |
| 2008/0058012 A1 * | 3/2008 | Ookuma | 455/557 |
| 2008/0180714 A1 | 7/2008 | Ishikawa | |
| 2009/0009780 A1 * | 1/2009 | Hayashi et al. | 358/1.9 |
| 2010/0110032 A1 | 5/2010 | Kim et al. | |

FOREIGN PATENT DOCUMENTS

| | | |
|---|---|---|
| CN | 101729808 A | 6/2010 |
| JP | 2008-187495 A | 8/2008 |
| JP | 2010-9121 A | 1/2010 |

OTHER PUBLICATIONS

Machine translation of JP Pub 2010-009121 to Nakagawa Koichi.*

* cited by examiner

*Primary Examiner* — Eric A Rust
*Assistant Examiner* — Haris Sabah
(74) *Attorney, Agent, or Firm* — Birch, Stewart, Kolasch & Birch, LLP

(57) ABSTRACT

A storage apparatus, which stores image data, comprises a storage-side transmitting/receiving section transmitting image data to an image processing apparatus and receiving image data from the image processing apparatus. The image processing apparatus, which carries out one or a plurality of processes related to image data, comprises a receiving section having reception areas each of which is provided fore each process for receiving an instruction of the processes; a specifying section detecting a relative position between the storage apparatus and the reception areas and specifying one reception area based on the variation of detected relative position; a processing-side transmitting/receiving section transmitting image data to the storage apparatus or receiving image data from the storage apparatus; and a processing section carrying out a process, corresponding to the reception area specified by the specifying section, on image data which the processing-side transmitting/receiving section transmits or receives.

6 Claims, 15 Drawing Sheets

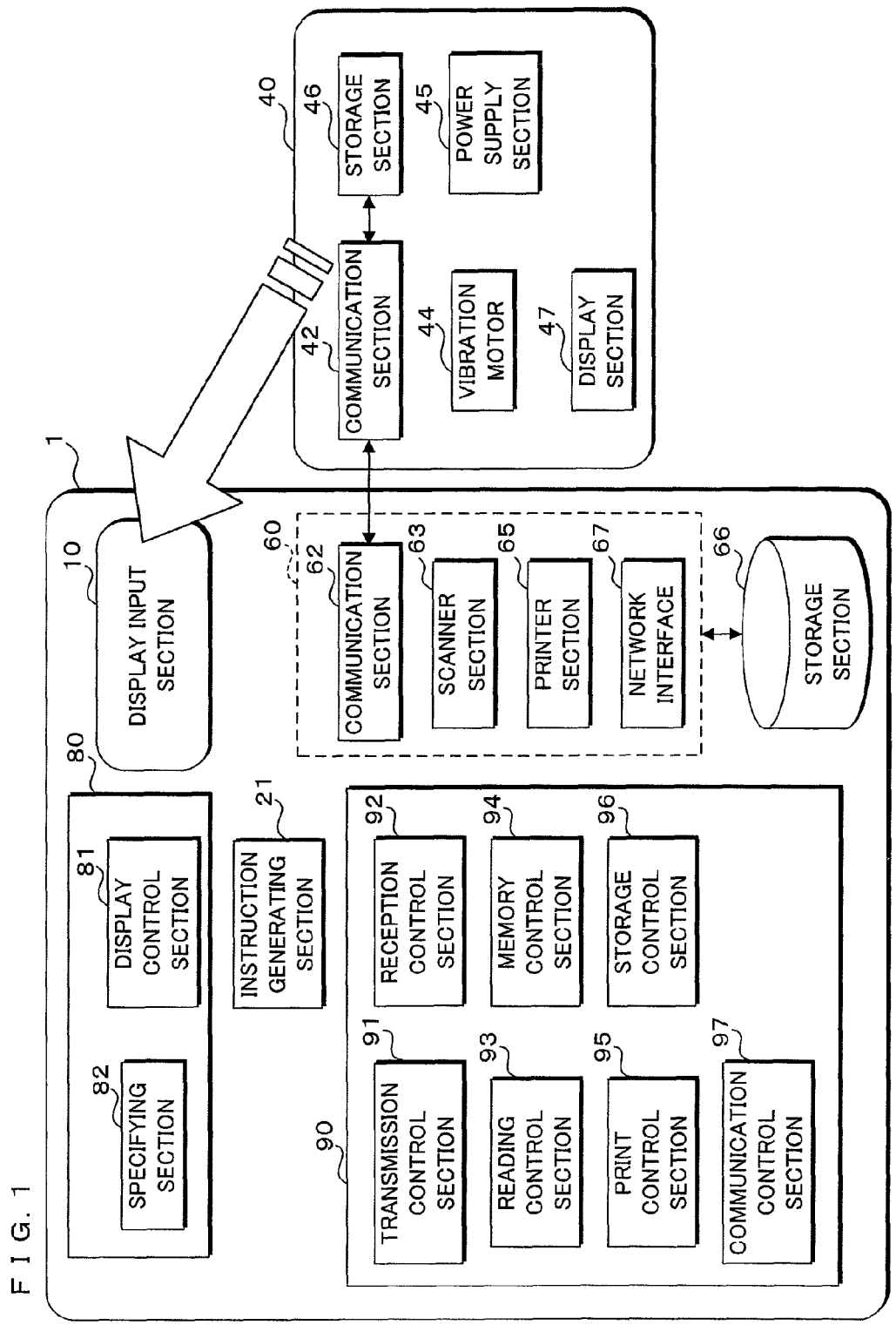
F I G. 1

IMAGE PROCESSING APPARATUS DETECTING POSITION BETWEEN MOBILE DEVICE AND RECEPTION AREAS AND RECEIVING AN INSTRUCTION OF PROCESSES

CROSS-REFERENCE TO RELATED APPLICATIONS

This non-provisional application claims priority under 35 U.S.C. §119(a) on Patent Application No. 2011-114038 filed in Japan on May 20, 2011. The entire contents of which are hereby incorporated by reference.

BACKGROUND

1. Technical Field

The present invention relates to an image processing apparatus carrying out a process related to image data and an instruction receiving apparatus receiving an instruction of processes.

2. Description of Related Art

Formerly, a multifunction printer, to which a memory device such as a USB memory is connectable, has a scan-to-memory function for reading an image by a scanner and generating image data so as to store the generated image data into a memory device. Additionally, a multifunction printer has a direct printing function for printing out image data stored in a memory device (see, for example, Japanese Patent Application Laid-Open No. 2008-187495).

When a scan-to-memory function is executed, an operator inputs through an input section such as an operation panel an instruction of reading an image by a scanner and generating image data and an instruction of storing the generated image data into a memory device. Additionally, when a direct printing function is executed; similarly, an operator inputs through an operation panel an instruction of selecting image data stored in a memory device and an instruction of printing out the selected image data.

Regarding an operation panel, a touch panel, which receives an input of instruction by carrying out an operation such as touching a display panel by a finger, becomes predominate. Therefore, an instruction of a scan-to-memory function through a touch panel is carried out by a drag-and-drop operation; for example, selecting an icon representing image data or an icon representing a scanner and then dragging the selected icon and dropping into a memory device. Additionally, when an operation of drag-and-drop is not carried out, an icon representing a scanner is selected and then an icon representing a memory device as a memory destination of generated image data is selected.

However, regarding to an input of instruction through a drag-and-drop operation, an operation error may be caused by detaching a finger from a touch panel at the middle of operation. Additionally, an input of the instruction, subjected to a selection of icons, is cumbersome since multiple icons have to be selected.

SUMMARY

In view of such circumstances, an object of the present invention is to provide an image processing apparatus and an instruction receiving apparatus which can easily carry out an operator's instruction of the process by detecting a relative position with respect to one other device.

An image processing apparatus according to the present invention is an image processing apparatus which carries out one or a plurality of processes related to image data transmitted to or received from one other device and has a receiving section having reception areas, each of which is provided for each process for receiving an instruction of the processes; a specifying section detecting a relative position between the other device and the reception areas and specifying one reception area based on the variation of detected relative position; and a processing section carrying out a process, corresponding to the reception area specified by the specifying section, on image data transmitted to or received from the other device.

The receiving section has reception areas, each of which is provided for each process, for receiving an instruction of the processes. The specifying section detects the relative position between the other device and the reception areas and specifies one reception area based on the variation of detected relative position. The processing section carries out a process, corresponding to the reception area specified by the specifying section, on image data transmitted to or received from the other device. Herewith, an instruction of image data processing related to the other device is easily executable.

Regarding to an image processing apparatus according to the present invention, the specifying section detects the relative position based on a radio strength of the proximity communication or a phase of a carrier wave in the proximity communication.

Regarding to an image processing apparatus according to the present invention, the processing section carries out different processes on the image data corresponding to each variation pattern of the relative position between the other device and the reception areas.

An image processing apparatus according to the present invention is an image processing apparatus which has a storage section storing one or a plurality of image data; a receiving section having reception areas each of which is provided for each image data stored in the storage section; a specifying section detecting a relative position between the reception areas and one other device and specifying one image data based on the variation of detected relative position; and a proximity communication section transmitting identification information of the image data specified by the specifying section to the other device through proximity communication.

The receiving section has reception areas each of which is provided for each image data stored in the storage section. The specifying section detects the relative position between the reception areas and the one other device and specifies one image data based on the variation of detected relative position. The proximity communication section transmits identification information of the image data specified by the specifying section to the other device through proximity communication.

An instruction receiving apparatus according to the present invention is an instruction receiving apparatus which has a receiving section having reception areas each of which is provided for each process for receiving an instruction of one or a plurality of processes; a proximity communication section carrying out communication through proximity communication; a specifying section detecting a relative position between a proximity communication device carrying out proximity communication and the reception areas and specifying one reception area based on the variation of detected relative position; and an instruction generating section generating an instruction of executing a process by a processing section corresponding to the reception area specified by the specifying section.

The receiving section has reception areas, each of which is provided for each process, for receiving an instruction of one or a plurality of processes. The proximity communication section performs communication through proximity communication. The specifying section detects a relative position between the proximity communication device carrying out proximity communication and the reception areas and specifies one reception area based on the variation of detected relative position. The instruction generating section generates an instruction of carrying out a process by a processing section corresponding to the reception area specified by the specifying section.

According to the present invention, it provides an image processing apparatus and an instruction receiving apparatus for easily carrying out an operator's instruction of processes by detecting a relative position with respect to one other device.

The above and further objects and features of the invention will more fully be apparent from the following detailed description with accompanying drawings.

BRIEF DESCRIPTION OF THE SEVERAL VIEWS OF THE DRAWINGS

FIG. 1 is a block diagram that shows a functional configuration of an image forming apparatus and a memory device.

DETAILED DESCRIPTION

Figure 2:
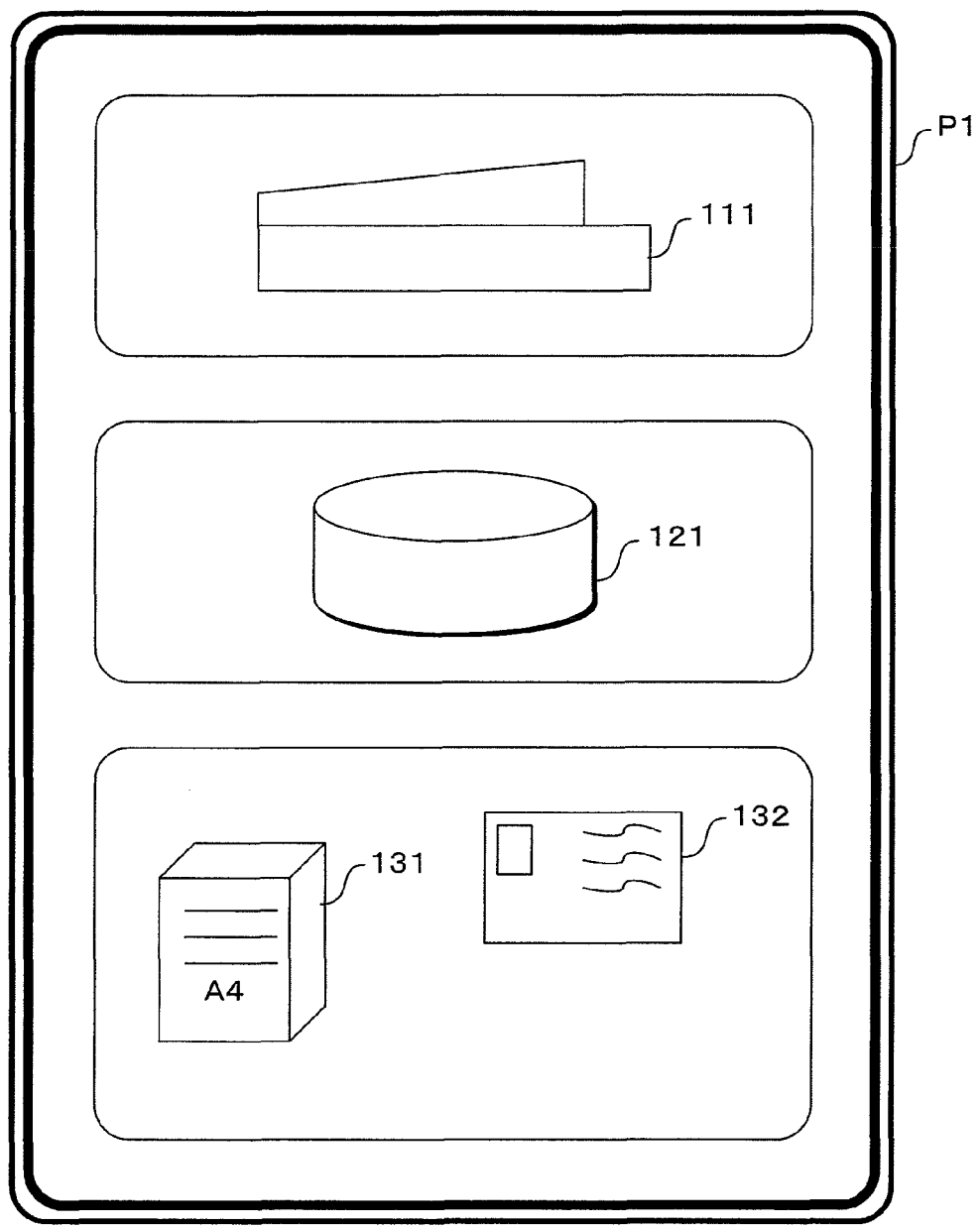
FIG. 2 is a view showing an example of a screen to be displayed in a display input section.

An embodiment of the present invention is described in more detail hereinafter with reference to the accompanying drawings. FIG. 1 is a block diagram that shows an example of the functional configuration of an image forming apparatus and a memory device. As referring to FIG. 1, a communication including image data is carried out in an image forming apparatus 1 based on a memory device 40, which is adjacent to the image forming apparatus 1.

The memory device 40 stores data to be inputted or outputted in proximity communication. The memory device 40 has a communication section 42, a storage section 46, a vibration motor 44, a power supply section 45, and a display section 47.

The communication section 42 carries out proximity communication. The communication section 42 carries out communication with one other terminal of proximity communication, which is placed in a short distance with respect to the memory device 40. The proximity communication, which is carried out by the communication section 42, utilizes Bluetooth™, Contactless IC, or Transfer Jet™. The storage section 46, which is configured by flash memory as an example, stores data inputted from the communication section 42. The power supply section 45, which is configured by a battery as an example, supplies power to each section in the memory device 40. The display section 47, which is configured by a LCD as an example, displays information, such as various status of the memory device 40, to be noticed to an operator. The vibration motor 44 generates a vibration in each status, specified by the memory device 40, including a successful communication by the communication section 42. Accordingly, a storage of data into the memory device 40 can be notified to an operator without displaying it in the display section 47.

The image forming apparatus 1 has a display input section 10, an instruction generating section 21, a device section 60, a storage section 66, a display input control section 80 and a control section 90.

The device section 60 has a communication section 62, a scanner section 63, a printer section 65 and a network interface section 67. The communication section 62 carries out proximity communication. The communication section 62 carries out proximity communication with the memory device 40 when the memory device 40 is adjacent to the image forming apparatus 1. The signals, which are transmitted from the communication section 62, are data including image data. Also, the signals, which are transmitted from the communication section 62, may include control command with respect to the image forming apparatus 1 and control command with respect to the memory device 40.

The scanner section 63 optically retrieves an image on a document and generates image data. The printer section 65 forms and outputs image data on a medium. The storage section 66, which is configured in a hard disk device as an example, stores a large amount of data including image data. The network interface 67 carries out communication with other devices, which are connected via network (not shown).

An instruction with respect to the image forming apparatus 1 is inputted to the display input section 10. The display input section 10, for example, has a touch panel and a LCD, and displays on the LCD an icon for inputting an instruction. The display input section 10 may display an instruction or a condition, which is already set with respect to the image forming apparatus 1. Also, the display input section 10 may display information of status of the process carried out by the image forming apparatus 1.

FIG. 2 is a view that shows an example of a screen to be displayed in the display input section 10. The screen P1 of FIG. 2 includes a scanner icon 111, a storage icon 121, a printer icon 131, and a mail icon 132. The functions executed by devices, which are configured in the image forming apparatus 1, correspond to the icons.

The scanner icon 111 corresponds to the scanner function carried out by the scanner section 63. The storage icon 121 corresponds to the storage function of data by the storage section 66. The printer icon 131 corresponds to the printing function executed by the printer section 65. The mail icon 132 corresponds to the email function via the network interface 67. The display input control section 80 controls the display input section 10.

The display input control section 80 has a display control section 81 and a specifying section 82. The display control section 81 carries out generation of a screen including an icon to be displayed in the display input section 10 and controls the display of the generated screen.

The specifying section 82 specifies, within areas included in a screen to be displayed in the display input section 10, areas and icons based on the operation by an operator with respect to the memory device 40. More specifically, the specifying section 82 specifies an area or an icon based on the variation of the relative position between the memory device 40 and the display input section 10.

For example, the variation of the relative position is detected by flicking or single clicking each area or icon included in the screen P1, with respect to the memory device 40. Additionally, regarding the variation of the relative position, a distance and a direction between the memory device 40 and each area or icon included in the screen P1, may be detected and obtained by carrying out proximity communication between the communication section 62 and the memory device 40. More specifically, the relative position is detected based on a radio strength of proximity communication or a phase of a carrier wave in proximity communication.

Additionally, when a touch is detected through a touch panel, the variation of the relative position with respect to the memory device 40 may be detected in proximity communication.

The instruction generating section 21 generates an instruction of processes controlled by the control section 90. The instruction generating section 21 generates an instruction of processes corresponding to the instruction receiving areas or icons specified by the specifying section 82. The instruction, generated by the instruction generating section 21, intends to process image data or data associated with the icons specified by the specifying section 82; alternatively, image data or data communicated with the memory device 40.

Additionally, the instruction generating section 21 generates different instructions for respective different variation patterns of the relative position between the memory device 40 and the display input section 10. For example, regarding the variation of the relative position with respect to the storage icon 121, when a flicking operation is carried out by the memory device 40 and when a dragging operation is carried out by the memory device 40, the instructions differ. More specifically, after image data is transferred to the memory device 40, in a case of flicking, storing image data stored in the storage section 66 is continued; and in a case of dragging, image data stored in the storage section 66 is deleted.

The control section 90 has a transmission control section 91, a reception control section 92, a reading control section 93, a memory control section 94, a print control section 95, a storage control section 96, and a communication control section 97.

Both the transmission control section 91 and the reception control section 92 control the communication section 62 to carry out proximity communication. The transmission control section 91 controls transmission of image data and control signal. The reception control section 92 controls reception of image data and control signal. The reading control section 93 controls the scanner section 63 to read an image on a document and generate image data. The memory control section 94 generates a control command to be transmitted to the memory device 40. The print control section 95 controls the printer section 65 to form image data on a medium. The storage control section 96 controls the storage of data to the storage section 66 and the reading of data from the storage section 66. The communication control section 97 controls communication through the network interface 67.

Figure 3:
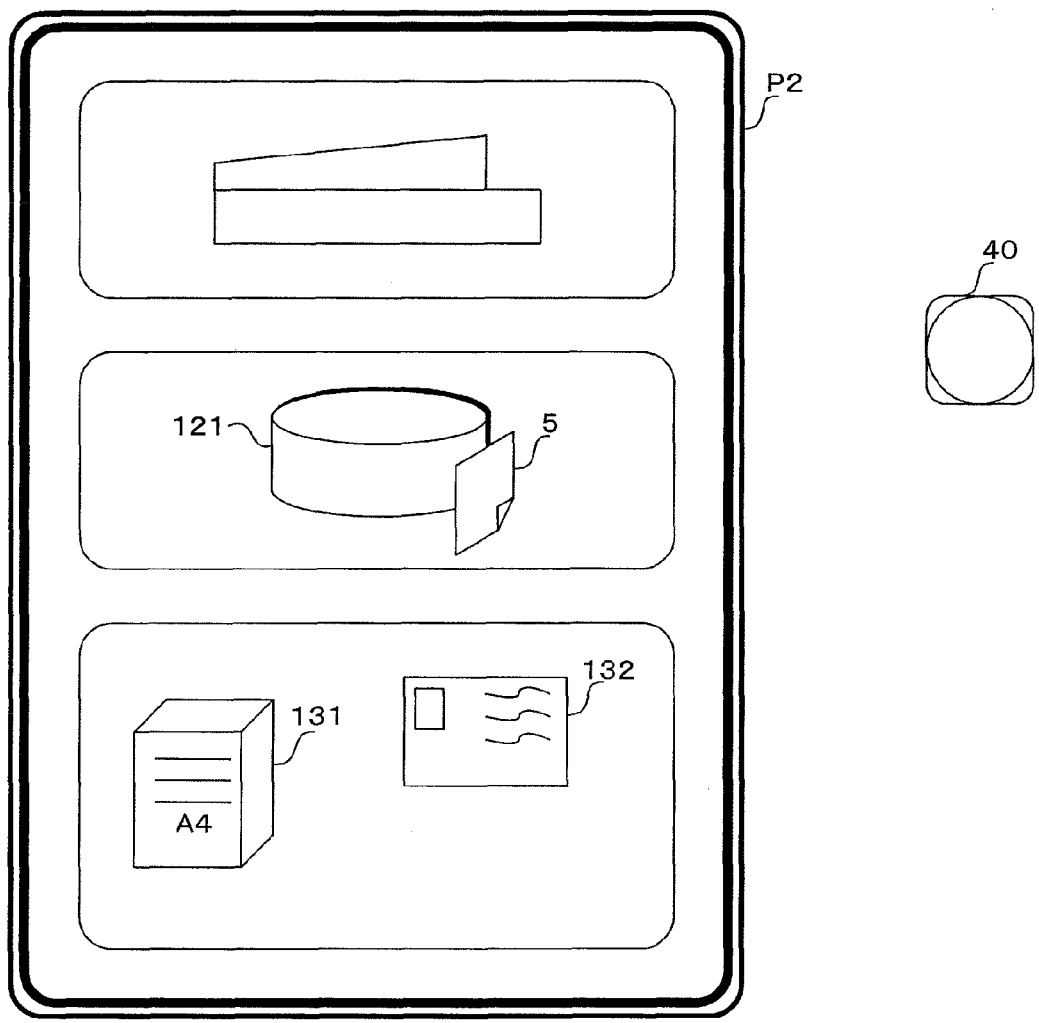
FIG. 3 is a schematic view of an example of an instruction inputted from the display input section.

FIG. 3 to FIG. 6 are schematic views that illustrate examples of an operator's instruction inputted from the display input section 10 based on the variation of the relative position between the memory device 40 and the display input section 10. In a screen P2 of FIG. 3, a data icon 5 of a data file is overlapped and displayed on the storage icon 121. The data icon 5 can identify one image data, which is being stored in the storage section 66. Additionally, as a plurality of image data are being stored in the storage section 66, each data icon corresponding to each image data is displayed. Additionally, the memory device 40 is illustrated in FIG. 3. The memory device 40, for example, is as large as a palm.

Figure 4:
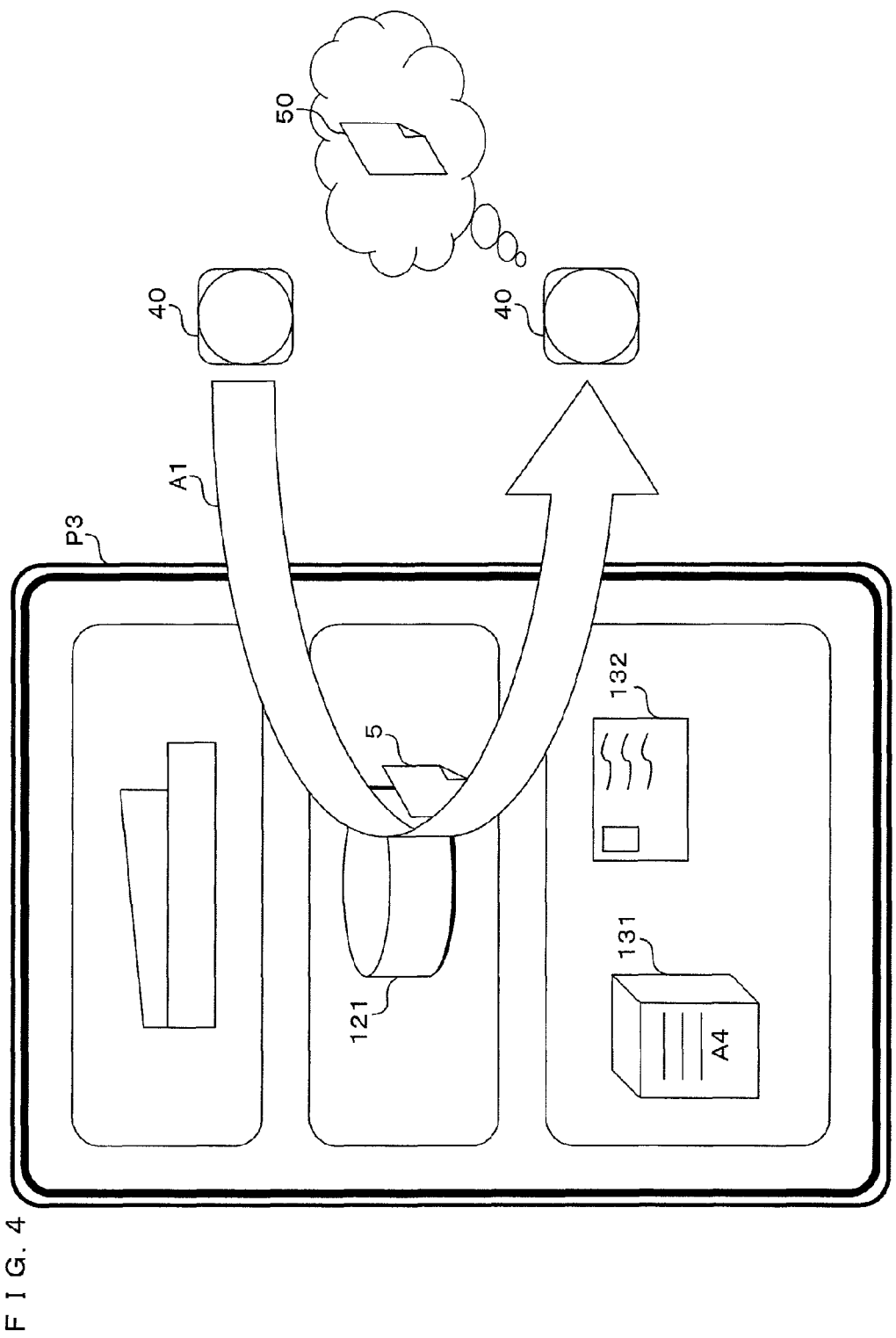
FIG. 4 is a schematic view of an example of an instruction inputted from the display input section.

FIG. 4 is a diagram that shows copying image data, which is identified by the data icon 5, and storing the image data into the memory device 40. In FIG. 4, the memory device 40 moves along an arrow A1. Due to this moving action, the memory device 40 comes close to the proximity of the storage icon 121, which is included in a screen P3.

More specifically, the memory device 40 comes close to the data icon 5, which is overlapped and displayed on the storage icon 121. Accordingly, the specifying section 82 specifies the data icon 5, and a signal indicating that data icon 5 is specified is transmitted to the instruction generating section 21. The instruction generating section 21 generates an instruction that transmits, in proximity communication, the image data 50 corresponding to the data icon 5 stored in the storage section 66, based on this signal.

According to this instruction generated by the instruction generating section 21, the storage control section 96 retrieves the image data 50 from the storage section 66; and the transmission control section 91 controls the communication section 62 to transmit the image data 50 in proximity communication. In the memory device 40, the communication section 42 receives the image data 50, and the storage section 46 stores the image data 50.

Additionally, proximity communication can be carried out when a terminal of proximity communication as a communication destination exists within the range of proximity communication being executable. Though the instruction generating section 21 generates an instruction with proximity communication, a message without a terminal of proximity or a message with a request to bring near to a terminal of proximity communication may be displayed, when one other terminal of proximity communication does not exist within the range of proximity communication being executable.

Figure 5:
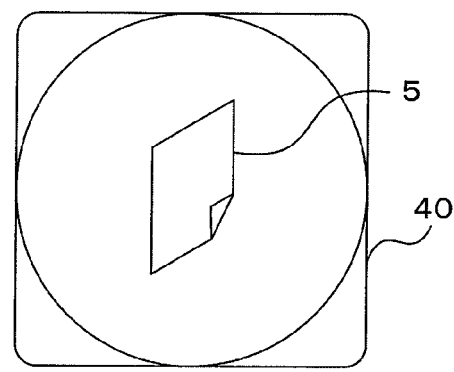
FIG. 5 is a schematic view of an example of an instruction inputted from the display input section.

FIG. 5 is a diagram showing an example that the data icon 5 is displayed in the display section 47 of the memory device 40. The display of the data icon 5 can notify an operator that the corresponding image data 50 is stored in the storage section 46.

Figure 6:
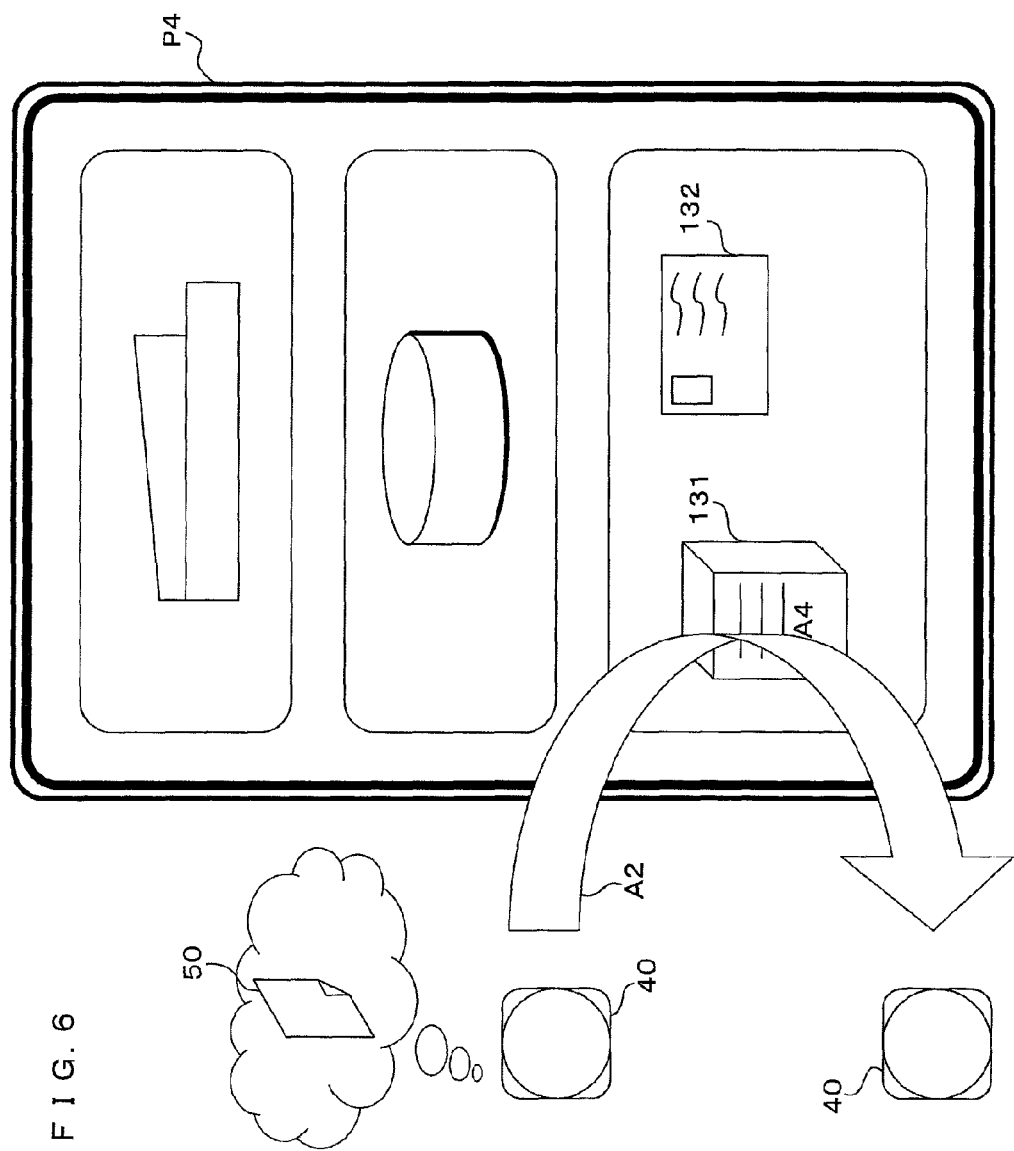
FIG. 6 is a schematic view of an example of an instruction inputted from the display input section.

FIG. 6 is a diagram that shows an example of generating an instruction to print the image data 50 according to the movement of the position of the memory device 40 made by an operator. In FIG. 6, the image data 50 is being stored in the storage section 46 of the memory device 40. The memory device 40 moves along an arrow A2 and approaches to the printer icon 131, which is included in a screen P4. Accordingly, the specifying section 82 transfers a signal indicating that the printer icon 131 is specified, to the instruction generating section 21.

Based on this signal, the instruction generating section 21 generates an instruction of receiving the image data 50 via the communication section 62 and printing it out by the printer section 65 based on the signal specified by the printer icon 131. According to the instruction generated by the instruction generating section 121, the reception control section 92 requests for the image data 50 with respect to the memory device 40. Accordingly, the communication section 42 of the memory device 40 transmits the image data 50 to the image forming apparatus 1. The reception control section 92 receives the image data 50 transmitted from the memory device 40, and the print control section 95 controls the printer section 65 to print out the image data 50.

Figure 7:
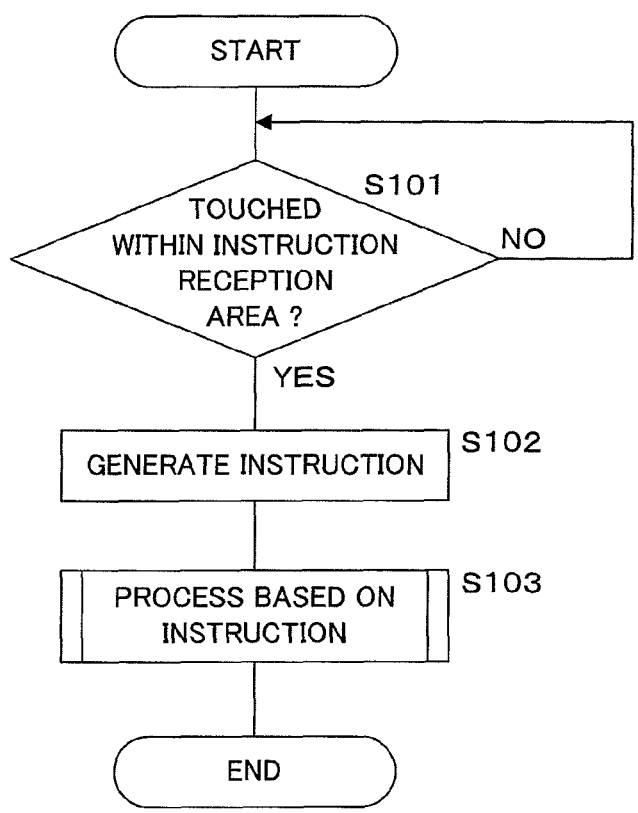
FIG. 7 is a flowchart that shows a procedure carrying out a process based on an instruction inputted from the display input section.

FIG. 7 is a flowchart that shows a procedure carrying out a process based on an instruction inputted from the display input section 10. The input instruction carried out in FIG. 7 is illustrated in FIG. 3 to FIG. 6 as examples. The process of FIG. 7 is executed by the display input control section 80, the instruction generating section 21, and the control section 90. The process of FIG. 7 is initiated from the status that the screen P1 is displayed in the display input section 10.

First, the specifying section 82 judges whether or not a touch is carried out on any of instruction reception areas on the screen P1 (Step S101). When a touch is carried out (Step S101: YES), the specifying section 82 specifies an icon designated by an operation of the memory device 40 based on the variation of the relative position between the memory device 40 and the instruction reception area and the instruction generating section 21 generates an instruction (Step S102). When a touch is not carried out (Step S101: NO), Step S101 is repeated. The control section 90 carries out a process based on the instruction generated by the instruction generating section 21 (Step S103).

Figure 8:
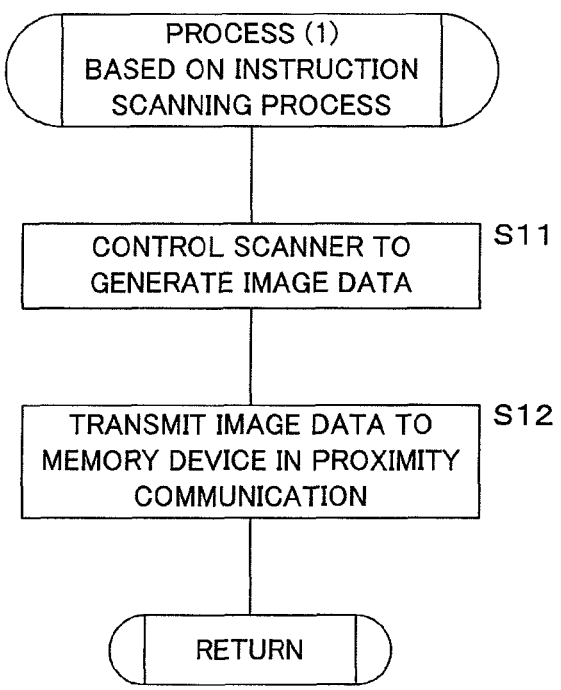
FIG. 8 is a flowchart that shows a procedure of scanning process executed by a control section.
Figure 9:
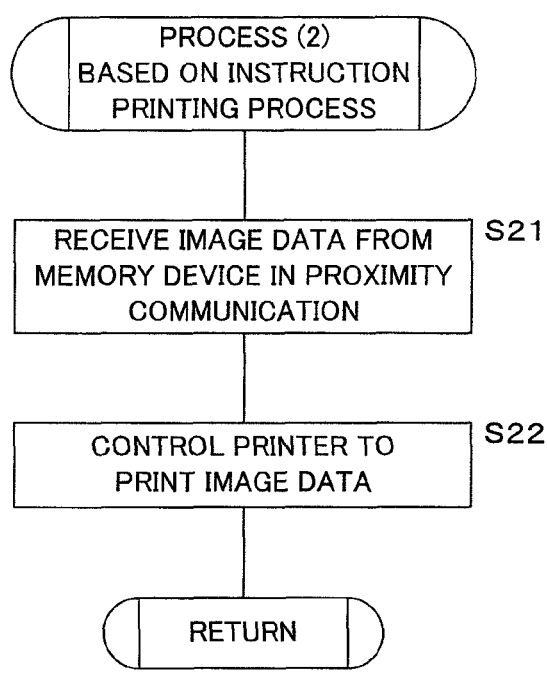
FIG. 9 is a flowchart that shows a procedure of printing process executed by the control section.
Figure 10:
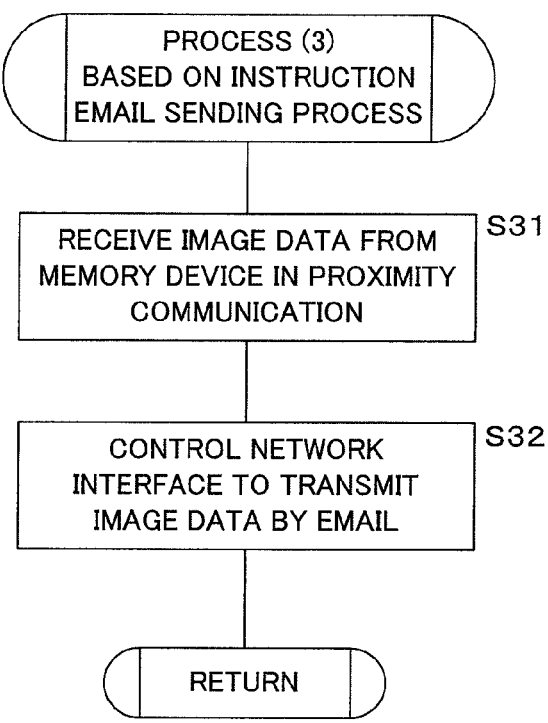
FIG. 10 is a flowchart that shows a procedure of mail sending process executed by the control section.

FIG. 8 to FIG. 10 are flowcharts that show procedures of processes carried out by the control section 90. The processes shown in FIG. 8 to FIG. 10 are carried out in Step S103 of FIG. 7. FIG. 8 is a flowchart that shows a procedure of a process (a scanning process) of generating image data by the scanner section 63. First, the reading control section 93 controls the scanner section 63 to generate image data (Step S11). The transmission control section 91 transmits image data generated by the reading control section 93 to the memory device 40 in proximity communication (Step S12).

FIG. 9 is a flowchart that shows a procedure of a process (a scanning process) to print out image data by the printer section 65. First, the reception control section 92 controls the communication section 62 to receive image data from the memory device 40 in proximity communication (Step S21). The print control section 95 controls the printer section 65 to print out image data (Step S22).

Additionally, when a plurality of image data are stored in the memory device 40; first, the reception control section 92 receives identification information of image data in proximity communication, and the display control section 81 displays in the display input section 10 an icon or a filename corresponding to each image data. An operator specifies image data as an intended process through the specifying section 82 based on an operation of flicking one icon from the displayed icons.

FIG. 10 is a flowchart that shows a procedure of a process (email sending process) of transmitting image data by an email through the network interface 67. First, the reception control section 92 controls the communication section 62 to receive image data from the memory device 40 in proximity communication (Step S31). The transmission control section 97 controls the network interface 67 to transmit image data with attached to an email (Step S32).

Figure 11:
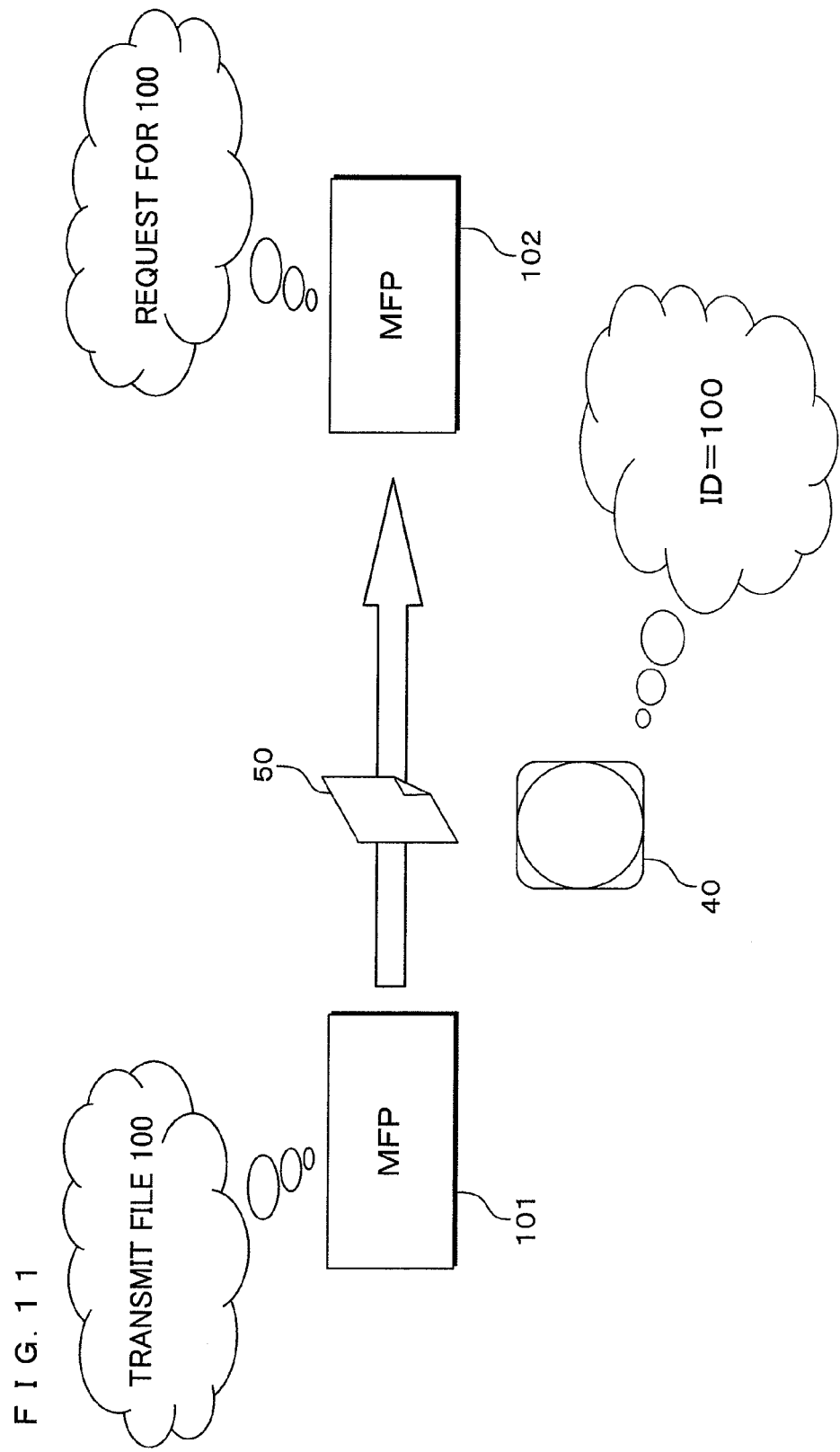
FIG. 11 is a view showing an example of carrying out a transfer of image data through a memory device among plural MFPs.

FIG. 11 is a diagram that shows an example of carrying out a transfer of image data through the memory device 40 among a plurality of MFPs. A MFP 101 and a MFP 102 have the same function and configuration as in the image forming apparatus 1. The process related to the MFP 101 is explained initially in FIG. 11. A screen, which is the same as the screen P2 of FIG. 3, is displayed in the display input section 10 included in the MFP 101. Identification Information of image data corresponding to the data icon 5 is transmitted to the memory device 40 in proximity communication carried out by the communication section 62 based on an operation of touching the memory device 40 to the data icon 5 in the screen P2. In the memory device 40, identification information is received in the communication section 42 and stored in the storage section 46. In the diagram, identification information is referenced as ID, and the ID of the image data corresponding to the data icon 5 is 100.

Next, the process related to the MFP 102 is explained. The specifying section 82 specifies an icon and the instruction generating section 21 generates an instruction to carry out a process based on the operation of touching the memory device 40 to the display input section 10 included in the MFP 102. Based on this instruction, the reception control section 92 included in the MFP 102 controls the communication section 62 to request for information stored in the memory device 40. Based on this request, the communication section 42 of the memory device 40 transmits ID, and the reception control section 92 receives the transmitted ID.

Based on the received ID, the communication control section 97 controls the network interface 67 to acquire image data from the MFP101. With respect to the acquired image data, the device section 60, by control of the control section 90, carries out a process corresponding to an instruction generated by the instruction generating section 21.

Figure 12:
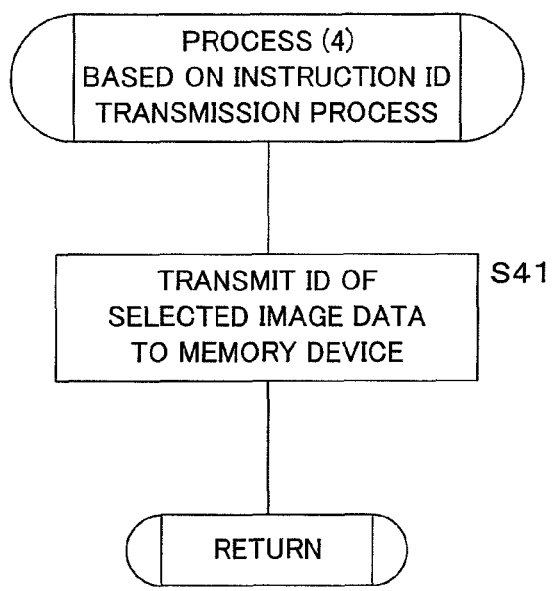
FIG. 12 is a flowchart that shows a procedure of ID sending process of image data.
Figure 13:
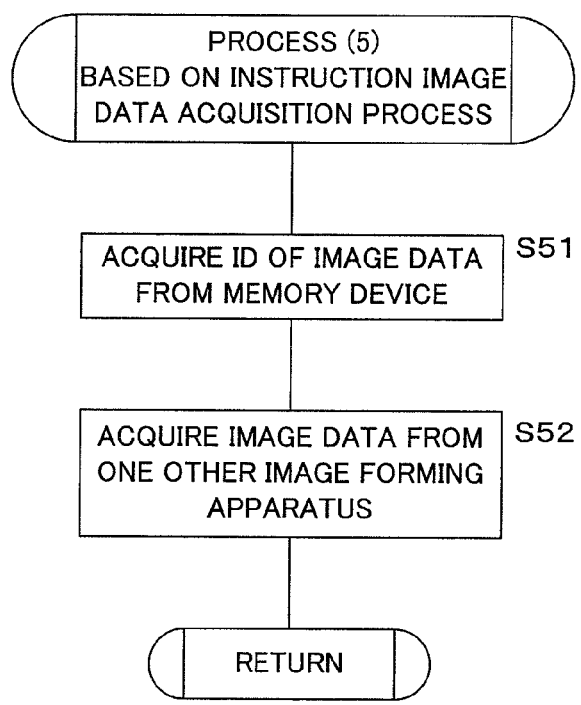
FIG. 13 is a flowchart that shows a procedure of image data acquiring process.

FIG. 12 and FIG. 13 are flowcharts that show procedures of processes related to the ID of image data in the process carried out by both the MFP 101 and MFP 102 in the example of FIG. 11. The processes of FIG. 12 and FIG. 13 are carried out in Step S103 of FIG. 7.

FIG. 12 is a flowchart that shows a procedure of a process related to the MFP 101 (an TD transmission process). The storage control section 96 included in the MFP 101 generates identification information of image data corresponding to the touched icon, and the transmission control section 91 controls the communication section 62 to transmit the generated identification information to the memory device 40 in proximity communication (Step S41).

FIG. 13 is a flowchart that shows a procedure of a process related to the MFP 102 (an image data acquisition process). The reception control section 92 included in the MFP 102 receives identification information of image data from the memory device 40 in proximity communication (Step S51). Next, the transmission control section 97 controls the network interface 67 to receive image data corresponding to identification information (Step S52). Additionally, in case when an instruction generated in Step S102 includes carrying out another process such as printout or email sending after acquiring image data, the corresponding process is carried out by the print control section 95 or the transmission control section 97.

In FIG. 11 to FIG. 13, the example of the ID of image data transmitted or received between a MFP and a memory device is described; however, in addition to the ID of image data, the ID of the MFP may also be transmitted or received. More specifically, the ID of the MFP 101 as well as the ID of image data may be transmitted to the memory device 40 from the MFP 101 in FIG. 11. The MFP 102 receives the ID of image data and the ID of the MFP 101 from the memory device 40. Accordingly, it becomes easier that the MFP 102 specifies MFP holding image data.

Figure 14:
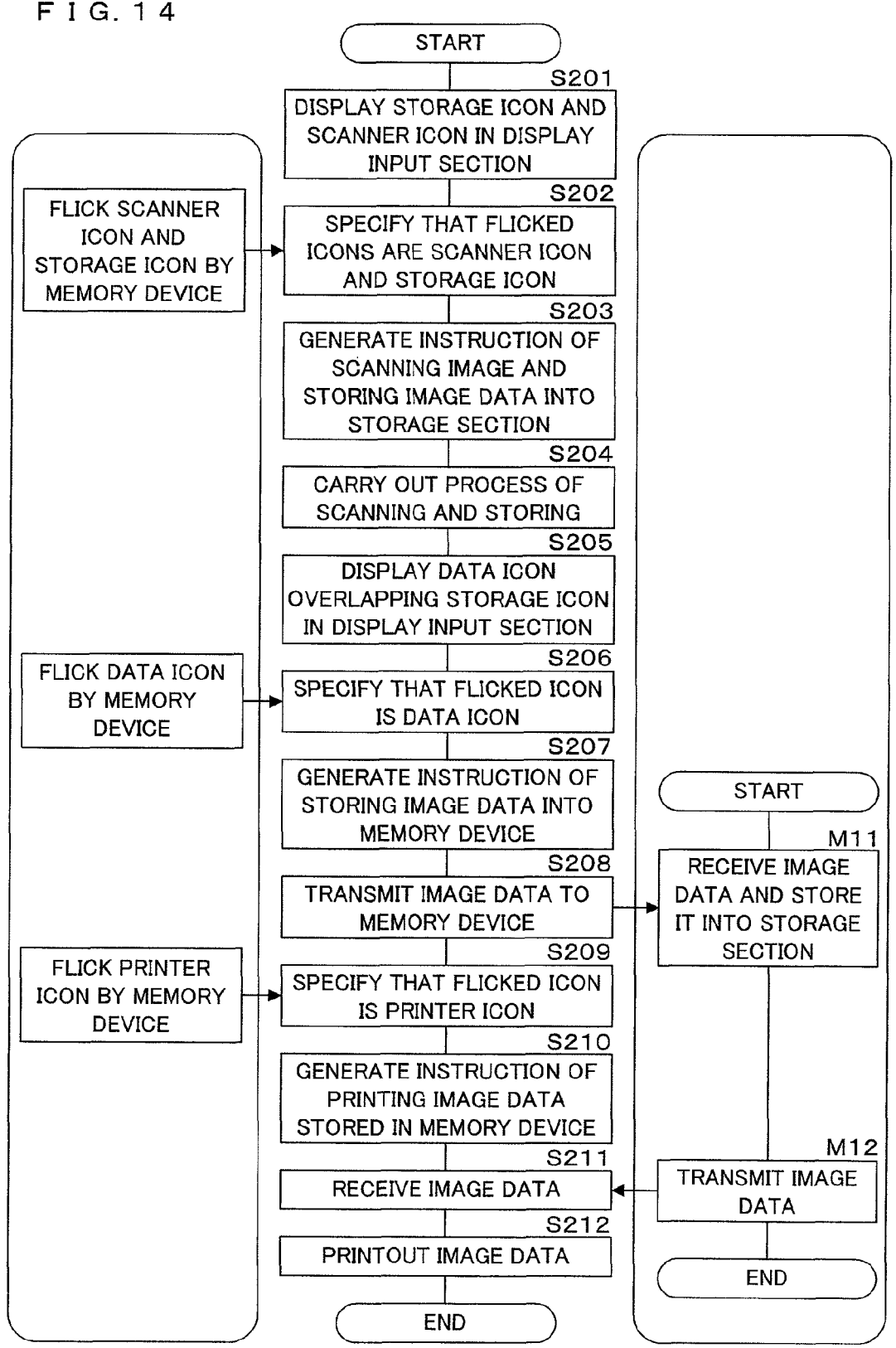
FIG. 14 is a flowchart that shows an example of a use case related to an image forming apparatus.

FIG. 14 is a flowchart that shows an example of a use case related to the image forming apparatus 1. A process of FIG. 14 is carried out by the image forming apparatus 1. Initially, the display control section 81 controls the display input section 10 to display a scanner icon and a storage icon (Step S201). For example, the screen P1 of FIG. 2 is displayed in the display input section 10.

Next, an operator flicks the scanner icon 111 and the storage icon 121 of the screen P1 by the memory device 40. This action is carried out for inputting an instruction of scanning an image of a document set in the scanner section 63, generating image data and storing the generated image data into the storage section 66.

The specifying section 82 specifies that the flicked icons are the scanner icon 111 and the storage icon 121 (Step S202). The instruction generating section 21 generates an instruction of scanning an image of a document set in the scanner section 63, generating image data and storing it into the storage section 66 (Step S203). Based on the generated instruction, the reading control section 93 controls the scanner section 63 to generate image data, and the storage control section 96 causes the storage section 66 to store the generated image data into the storage section 66 (Step S204).

The display control section 81 displays a data icon corresponding to image data stored in the storage section 66 in a screen displayed by the display input section 10 (Step S205). For example, as referring to the screen P2, the data icon 5 is displayed so as to overlap the storage icon 121 of the screen P1.

An operator utilizes the memory device 40 and flicks the data icon 5 included in a screen displayed by the display input section 10. The specifying section 82 specifies that the flicked icon is the data icon 5 (Step S206). The instruction generating section 21 generates an instruction of retrieving image data corresponding to the data icon 5 from the storage section 66 and transmitting it to the memory device 40 (Step S207).

According to the generated instruction, the storage control section 96 retrieves image data stored in the storage section 66, and the transmission control section 91 controls the communication section 62 to transmit the retrieved image data to the memory device 40 (Step S208). In the memory device 40, the communication section 42 receives the image data, and image data is stored into the storage section 46 (Step M11).

An operator utilizes the memory device 40 and flicks the printer icon 131. Here, the printer icon 131 being displayed in the screen P2 is flicked. The specifying section 82 specifies that the flicked icon is the printer icon 131 (Step S209).

The instruction generating section 21 generates an instruction of receiving image data stored in the memory device 40 and printing it (Step S210). The reception control section 92 requests for image data with respect to the memory device 40, and then the communication section 42 of the memory device 40 transmits image data (Step M12). The reception control section 92 controls the communication section 62 to receive image data from the memory device 40 (Step S211). The print control section 95 controls the printer section 65 to print out the received image data (Step S212).

Figure 15:
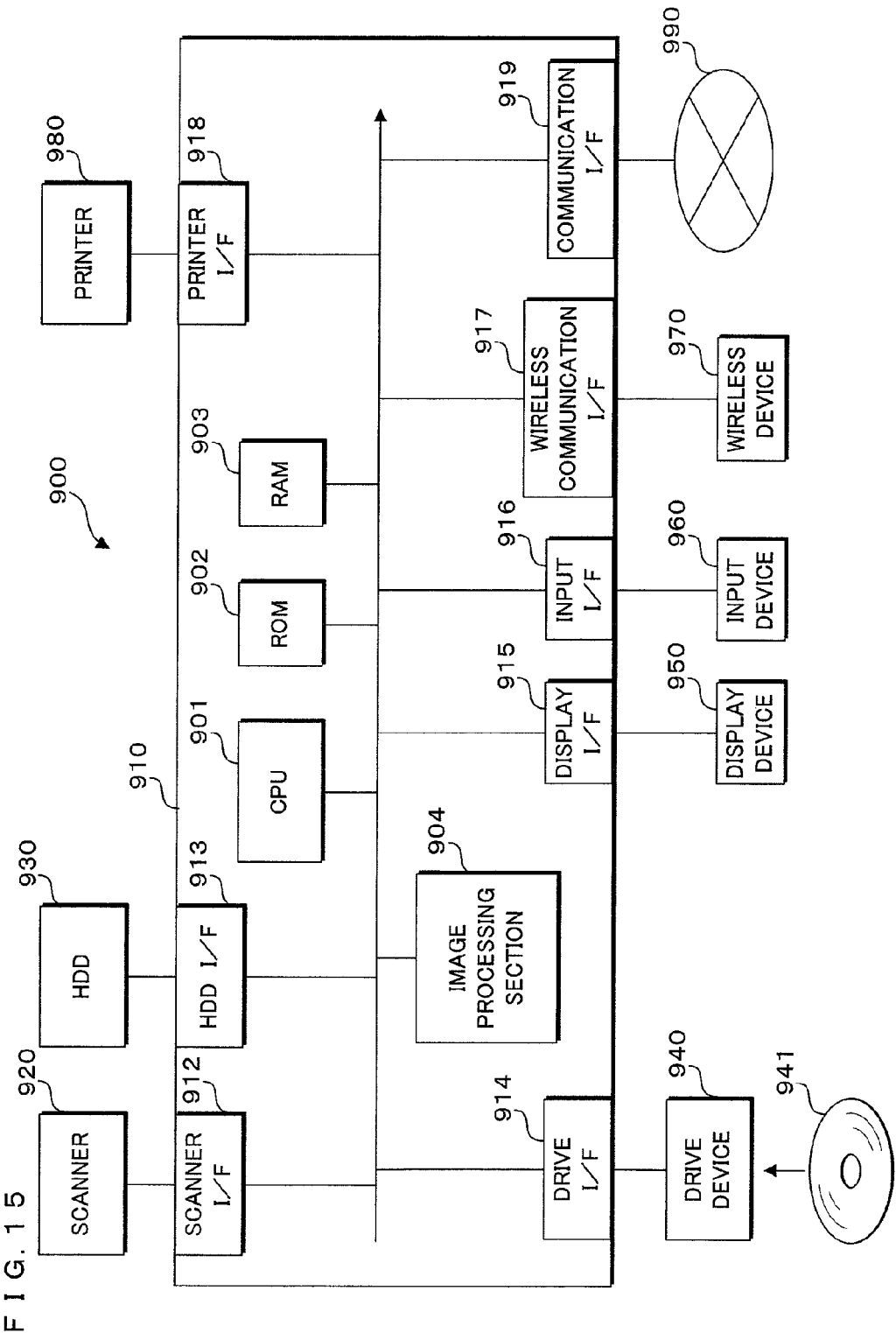
FIG. 15 is a block diagram that shows an example of hardware configuration of an image forming apparatus.

FIG. 15 is a diagram that shows an example of the hardware configuration of an image forming apparatus of which the functional configuration is shown in FIG. 1. An image forming apparatus 900 of FIG. 15 has a control section 910, a scanner 920, a hard disk device (referred to as a "HDD" below) 930, a drive device 940, a display device 950, an input device 960, a wireless device 970 and a printer 980. The control section 910 controls each section connected to the control section 910 and processes image data outputted from the image forming apparatus 900. Additionally, the control section 910 may be configured as a personal computer.

The control section 910 has a CPU 901, a ROM 902, a RAM 903, an image processing section 904, a scanner interface (referred to as a "scanner I/F" below) 912, an HDD interface (referred to as an "HDD I/F" below) 913, a drive interface (referred to as a "drive I/F" below) 914, a display interface (referred to as a "display I/F" below) 915, an input interface (referred to as an "input I/F" below) 916, a wireless communication interface (referred to as a "wireless communication I/F" below) 917, a printer interface (referred to as a "printer I/F" below) 918, and a communication interface (referred to as a "communication I/F" below) 919.

The CPU 901 carries out control of each section of the control section 910 and each section connected to the control section 910 by executing a computer program. The ROM 902, for example, stores a computer program executed by the CPU 901. The RAM 903 stores image data to be processed by an existing function with respect to a computer program carried out by an image processing section 904 and the CPU 901. Additionally, image data may be stored in the ROM 902.

The image processing section 904 carries out various controls with respect to image data. The image processing section 904 carries out any one of processes, such as segmentation process, page background removal process, color correction process, black generation and under color removal process, spatial filter process, output gradation correction process, and halftone generation process. A program executed by the CPU 901 may perform the processes carried out by the image processing section 904. In this case, the image processing section 904 may not be provided in the control section 901.

The scanner I/F 912 accepts image data inputted from the scanner 920 and carries out an image process according to the property of the scanner 920. The HDD I/F 913 carries out input and output of image data stored in the HDD 930 based on the control of the CPU 901. The drive I/F 914 carries out the input and output of data with respect to a removable recording medium 941 inserted to the drive device 940.

The display I/F 915 outputs image data, which is displayed by the display device 950. The image data displayed by the display device 950 is generated or edited by, for example, a program executed by the CPU 901. The input I/F 916 accepts signals inputted from the input device 960. The signal, inputted from the input I/F 916, is used when the CPU 901 executes a computer program.

The wireless communication I/F 917 is an interface as wirelessly communicating image data or control signal with one other apparatus through the wireless device 970. The printer I/F 918 is an interface as outputting image data, processed by the control section 910, to the printer 980. The communication I/F 919 is an interface as communicating image data or control signal with one other apparatus through the network 990.

The scanner 920 reads optically a document on which an image is formed and outputs image data. The image data outputted from the scanner 920 may be an analog signal or a digital signal converted from an analog signal. The HDD 930 stores image data to be processed by the control section 910. The HDD 930 stores, for example, image data inputted from the scanner 920, image data inputted from the communication I/F 919, and intermediate image data generated by a process of the CPU 901 and the image processing section 904. The drive device 940, by connecting to a removable recording medium 941, carries out reading and writing of data with respect to the removable recording medium 941. For example, the computer program, executed by the CPU 901, is stored in the removable recording medium 941.

The display device 950 displays the information related to the process carried out by the image processing apparatus 900. The status of a process carried out by the image forming apparatus 900 and the configured information with respect to a process carried out by the image forming apparatus 900 are displayed. For example, the display device 950 is a LCD. The input device 960 inputs an instruction from an operator with respect to the control section 910. The input device 960 accepts an instruction inputted by an operator, and transmits the signal corresponding to the instruction to the control section 910. For example, the input device 960 is a touch panel. Additionally, the display device 950 and the input device 960 correspond to the display reception section 10 related to an embodiment of the present invention.

The wireless device 970 carries out communication with one other wireless device in wireless communication. For example, wireless communication carried out by the wireless device 970 is proximity communication. The printer 980 outputs and forms image data, processed by the control section 910, on a medium.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus carrying out one or a plurality of processes related to image data transmitted to or received from a movable one other device, comprising:
    a receiving section having reception areas, each of which is provided for each process for receiving an instruction of the processes;
    a specifying section detecting a relative position between said movable other device and the reception areas and specifying one reception area based on the variation of detected relative position; and
    a processing section carrying out a process, corresponding to the reception area specified by said specifying section, on image data transmitted to or received from said other device.

2. The image processing apparatus of claim 1,
    wherein said specifying section detects the relative position based on a radio strength of proximity communication or a phase of a carrier wave in the proximity communication.

3. The image processing apparatus of claim 1,
    wherein said processing section carries out different processes on the image data corresponding to each variation pattern of the relative position between said movable one other device and the reception areas.

4. The image processing apparatus of claim 1, wherein said movable one other device is as large as a human palm.

5. An image processing apparatus, comprising:
    a storage section storing one or a plurality of image data;
    a receiving section having reception areas each of which is provided for each image data stored in said storage section;
    a specifying section detecting a relative position between the reception areas and a movable one other device and specifying one image data based on the variation of detected relative position; and
    a proximity communication section transmitting identification information of the image data specified by said specifying section to said movable one other device through proximity communication.

6. The image processing apparatus of claim 5, wherein said movable one other device is as large a human palm.

* * * * *